L. S. FLATAU.

Assignor of one-half to H. C. WALKER.

WHIFFLETREE.

No. 11,157. Reissued Apr. 21, 1891.

WITNESSES:

J. A. Hurdle

B. Fox

INVENTOR

Louis S. Flatau

BY

J. N. McIntire

ATTORNEY

THE NORRIS PETERS CO., PHOTO-LITHO., WASHINGTON, D. C.

UNITED STATES PATENT OFFICE.

LOUIS S. FLATAU, OF PITTSBURG, ASSIGNOR OF ONE-HALF TO H. C. WALKER, OF TARRANT COUNTY, TEXAS.

WHIFFLETREE.

SPECIFICATION forming part of Reissued Letters Patent No. 11,157, dated April 21, 1891.

Original No. 406,207, dated July 2, 1889. Application for reissue filed February 7, 1891. Serial No. 380,675.

*To all whom it may concern:*

Be it known that I, LOUIS S. FLATAU, of Pittsburg, in the county of Camp and State of Texas, have invented a new and useful Improvement in Whiffletrees, of which the following is a specification.

My invention consists in a new and improved whiffletree, which will be hereinafter fully described and claimed.

Figure 1:
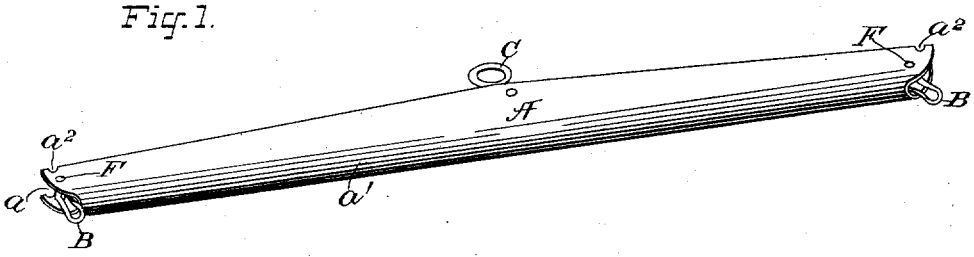
Figure 2:
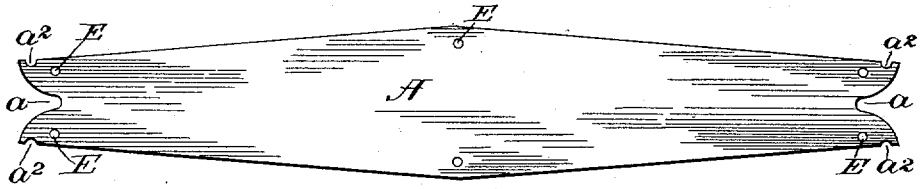
Figure 3:
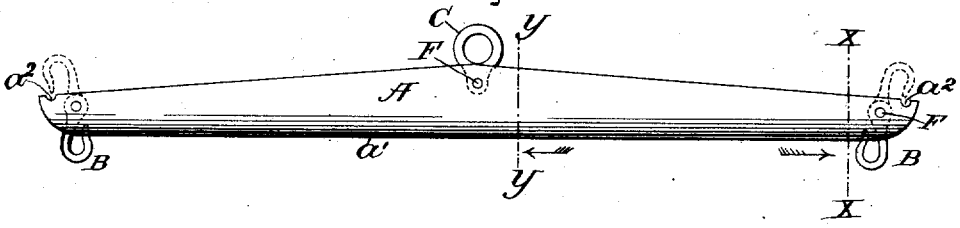
Figure 4:
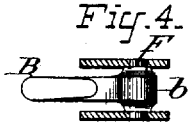
Figure 6:
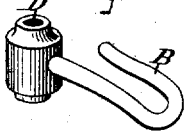
Figure 5:
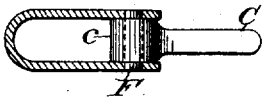

Referring to the accompanying drawings, Figure 1 is a perspective view of a singletree constructed according to my invention. Fig. 2 is a plan view of the metal blank or plate out of which my new and improved whiffletree is formed. Fig. 3 is a top view of the singletree shown in Fig. 1, the end hooks thereof being shown in dotted lines turned back. Fig. 4 is a sectional view, on an increased scale, at line $x$ $x$ of Fig. 3. Fig. 5 is a similar view at line $y$ $y$ of Fig. 3; and Fig. 6 is a perspective view, on an enlarged scale, of one end hook detached.

The same letters of reference indicate corresponding parts in all the figures.

Referring to the several parts by letter, A indicates the metal blank out of which I form my whiffletree, and I prefer to make it of steel. This blank is shaped or cut of substantially the form shown in Fig. 2 of the drawings, tapering slightly from the middle toward each end and recessed or cut out at each end at $a$; also at the outer edges near the ends small half-circles $a^2$ $a^2$ are cut out of the blank. This metal blank is then bent into shape longitudinally around a suitable mandrel with a round front edge until the sides of the whiffletree thus formed are parallel, the mandrel being usually three-quarters of an inch thick. The metal blank is thus formed into a hollow whiffletree, the back being open, while the rounded front $a'$ is next to the horse. The semicircular recesses $a^2$ $a^2$ at each end are directly opposite each other, as shown.

B B indicate the end hooks, and C the middle ring, each of the three being preferably formed with an enlargement or boss $b$ $c$ at its inner or pivoted end. The enlarged inner ends of the hooks and the ring are formed with perforations D, which register with holes E E in the hollow tree when they are placed in position, and they are secured in position in the whiffletree by rivets F, passing through the holes E in the tree and the perforation D in the enlarged inner ends of the end hooks and ring, respectively. The end hooks are pivoted in the recessed ends of the whiffletree, as shown in the drawings, so that to hook the trace-rings at the end of the traces into the end hooks the hooks are turned back until their points are at the semicircular recesses $a^2$, as shown in the dotted lines in Fig. 3, when the ring at the end of the trace can be readily slipped over the point of the hook, and after the hooks are thus engaged they are turned forward into their normal position, when it will be seen that the points or free ends of the hooks will stop and bear against the end of the slot or recess $a$, so that no draft will have a tendency to straighten the hooks, and the trace-rings will be effectually prevented from coming loose or unhooked, which is a great objection to many other singletrees. This is a very important point.

If preferred, I can dispense with the semicircular recesses $a^2$ by forming the points of the hooks shorter, so that when the hook is turned back there will be room to hook and unhook the trace.

From the foregoing description, taken in connection with the accompanying drawings, the construction and advantages of my invention will be readily understood.

It will be seen that my metal whiffletree—either single or double tree—is simple and cheap in construction and light and very strong, while the end hooks will act as automatic safety-hooks to render it impossible for the traces to become accidentally unhooked.

Having thus described my invention, what I claim, and desire to secure by Letters Patent, is—

1. In combination with the perforated metal plate bent to form a hollow tree, as specified, the hooks and ring having perforated ends, and the rivets arranged in said perforations and in those of the plate, all substantially as set forth.

2. In combination with the metal plate bent to form a hollow tree and having its ends recessed at the bent portion of the plate, as specified, trace-hooks pivoted between the parallel portions of the bent plate and arranged to permit the releasement of trace-rings when swung out of the working position and to prevent such releasement when under draft strain, as set forth.

3. In combination with the metallic whiffletree end formed with a longitudinal recess $a$, the hook pivoted to swing into said recess when under draft strain and arranged to have its free end come to a stop against and engage with the root or end of said recess to prevent any straightening out of the hook by the draft strain, all substantially as set forth.

4. In a whiffletree, the combination, with the longitudinally-recessed metallic ends and the hooks pivoted therein, of the recesses $a^2$, the whole constructed and operating substantially as and for the purpose set forth.

In witness whereof I have hereunto set my hand this 2d day of February, 1891.

LOUIS S. FLATAU.

In presence of—
STUART WOODSON,
GEO. C. HUDGINS.